3,812,062
PRODUCTION OF FOAM PLASTICS FROM HIGH MOLECULAR WEIGHT OLEFIN POLYMERS

Hermann Tatzel, Leutershausen, and Gilbert Beck, Ludwigshafen, Germany, assignors to Badische Anilin- & Soda-Fabrik Aktiengesellschaft, Ludwigshafen (Rhine), Germany
No Drawing. Filed May 17, 1972, Ser. No. 253,937
Claims priority, application Germany, May 29, 1971,
P 21 26 812.2
Int. Cl. C08f 29/02, 47/10
U.S. Cl. 260—2.5 E        4 Claims

ABSTRACT OF THE DISCLOSURE

The production of foam plastics from olefin polymers of high molecular weight whose X-ray crystallinity at 25° C. is more than 50% by weight by mixing the olefin polymer at a temperature which is from 50° to 100° C. above the crystallite melting point of the olefin polymer at a shear rate of from 20 to 200 sec.$^{-1}$ at superatmospheric pressure with an aromatic hydrocarbon, homogenizing the mixture in a zone at a temperature between the crystallite melting point of the olefin polymer and a maximum of 50° C. above the same and at a shear rate of from 500 to 1500 sec.$^{-1}$ with from 5 to 40% by weight of a hydrocarbon and/or halohydrocarbon at a pressure which prevents foaming of the mixture, cooling the resultant homogeneous gel to a temperature which is from 10° to 60° C. below the crystallite melting point of the olefin polymer, and expressing the homogeneous gel into a zone in which a pressure prevails which is below the vapor pressure of the expanding agent in the gel. The products are used as insulation materials and packaging inserts.

---

The invention relates to a process for the production of foam plastics from high molecular weight olefin polymers whose X-ray crystallinity at 25° C. is more than 50% by weight.

High molecular weight polyethylene which has been prepared by the low pressure method or conventional polypropylene cannot (as high pressure polyethylene can) be expanded by mixing with a liquid expanding agent at superatmospheric pressure in an extruder and expressing the homogeneous mixture to form a cellular article which is uniform and has a low unit weight. Incorporation of a liquid expanding agent into the high molecular weight polymers only takes place very slowly and irregularly. Owing to the high molecular weight of the polymers, only low throughputs are possible and high melting temperatures are necessary in the mixing zone.

A process for the production of expanded particles of high molecular olefin polymers whose X-ray crystallinity at 25° C. is at least 50% by weight is known from German Printed Application No. 1,285,722. In this process the surface of the partially crystalline finely particled olefin polymer is first crosslinked to such an extent that the particles do not sinter together when they are heated at a temperature above the crystallite melting point of the polymer, then the particles are treated with a hydrocarbon or halohydrocarbon at a temperature which is from 10° to 40° C. below the melting point of the polymer and at a pressure which is equal to or greater than the vapor pressure of the hydrocarbon or halohydrocarbon at the temperature used and the pressure on the resultant finely particled gel is then released. The particles thus obtained can only be welded together into moldings with difficulty because the tackiness of the particles of partially crystalline olefin polymer is decreased by superficial crosslinking.

It is an object of the invention to provide a process for the production of expanded plastics from high molecular weight olefin polymers whose X-ray crystallinity at 25° C. is more than 50% by weight which does not suffer from the disadvantages of the said method.

We have found that this object is achieved by mixing the olefin polymer at a temperature which is from 50° to 100° C. above the crystallite melting point of the olefin polymer and at a shear rate of from 20 to 200 seconds$^{-1}$ at superatmospheric pressure with an aromatic hydrocarbon, introducing the mixture into a zone in which it is homogenized at a temperature of from the crystallite melting point of the polymer to a maximum of 50° C. above the same and at a shear rate of from 500 to 1500 seconds$^{-1}$ with from 5 to 40% by weight of a hydrocarbon and/or halohydrocarbon whose boiling point is from 30° to 200° C. below the crystallite melting point of the polymer at a pressure which prevents expansion of the mixture, cooling the resultant homogeneous gel at superatmospheric pressure to a temperature which is from 10° to 60° C. below the crystallite melting point of the olefin polymer and forcing it into a zone in which a pressure prevails which is lower than the vapor pressure of the expanding agent in the gel.

The term high molecular weight olefin polymer whose X-ray crystallinity at 25° C. is more than 50% by weight means especially homopolymers of ethylene and propylene and also crystalline copolymers of the said monomers. These polymers are prepared in the polymerization of ethylene or propylene in the presence of conventional catalysts based on organoaluminum compounds and titanium halides or on chromium(VI) oxide on carrier materials, for example mixtures of silicic acid and aluminum oxide at pressures of up to 200 atmospheres and temperatures below the softening point of the polyolefins. These polymers exhibit a coarse-powdered structure. Copolymers of ethylene or propylene with α-alkanes of four to twelve carbon atoms are also suitable for the process of the invention.

The said olefin polymers are mixed at superatmospheric pressure at a temperature which is from 50° to 100° C. above the crystallite melting point of the polymers with an aromatic hydrocarbon. The components are mixed in a zone in which a fairly low shear gradient prevails. The shear rate is from 20 to 200 seconds$^{-1}$. Those aromatic hydrocarbons are suitable which cause swelling of the crystalline polyolefins, for example m-xylene, o-xylene, p-xylene, toluene, benzene and chlorobenzene. The boiling point of the aromatic hydrocarbons should not be above 140° C. The amount of aromatic hydrocarbon used, which is pumped under pressure into the mixing zone, is from 0.5 to 10% by weight based on the olefin polymer used.

The mixture of olefin polymer and aromatic hydrocarbon is then cooled to a temperature which is between the crystallite melting point of the polymer and a maximum of 50° C. above the same and passed into a zone in which a shear rate of from 500 to 1500 seconds$^{-1}$ prevails. The mixture of olefin polymer and aromatic hydrocarbon is homogenized in this zone with from 5 to 40% by weight (based on the olefin polymer) of a hydrocarbon and/or halohydrocarbon. The boiling point of the expanding agent concerned is from 30° to 200° C. below the crystallite melting point of the olefin polymer. For example saturated and ethylenically unsaturated hydrocarbons of three to seven carbon atoms such as propane, butane, heptane, pentane, hexane, propene, butene, pentene, hexene, heptene, 2,2'-dimethylpentane and other branched hydrocarbons are suitable. Those halohydrocarbons are particularly suitable which have one or two carbon atoms such as methyl chloride, dichloromethane, fluorotrichloromethane, monofluorodichloromethane, 1,2,2-trifluorotrichloroethane and 1,1,2,2-tetrafluorodichloroethane. It is also possible to use mixtures of expanding agents. The expanding agent should form a gel with the polymer. A gel is defined as a homogeneous mixture of the polymer with the expanding agent. In the said two zones and in the following zone in which the mixture is cooled, the mixture is kept at a pressure which prevents expansion of the gel. Pressures of from 25 to 55 atmospheres are generally used.

The homogeneous gel formed is then cooled under pressure to a temperature which is from 10° to 60° C. below the crystallite melting point of the olefin polymer. If the gel were to be relieved of pressure, for example to atmospheric pressure, it would expand. The gel need not necessarily be expanded to atmospheric pressure, but it is sufficient for the formation of the expanded plastics for the gel to be forced into a zone in which a pressure prevails which is lower than the vapor pressure of the expanding agent in the gel. This definition means that the gel can also be expanded at subatmospheric pressure.

Depending on the type of die through which the gel is forced, strands, strips or other profiles are obtained. It is particularly advantageous to prepare foam particles by the process of the invention. The particles as a rule have a diameter of from 5 to 25 mm. For this purpose the gel, prepared for example in an extruder, is expanded through a perforated die. The extruded strands containing expanding agent are then cut up into cylindrical particles by a a rotating blade. Depending on the type of expanding agent used, the particles may shrink immediately after production because the expanding agent diffuses more rapidly from the cells of the particles than the air penetrates into them. The shrunken particles may be expanded again at temperatures below the crystallite melting point of the olefin polymer and elevated pressures of up to about 10 atmospheres. The particles are stored in an atmosphere of either air or nitrogen. The particles then no longer contain any expanding agent and are completely expanded. They may be sintered into mouldings by heating them to a temperature above the crystallite melting point of the polymer.

If from 5 to 30% by weight of polyisobutylene or a copolymer of isobutylene is added to the expanding agent in the production of the expanded plastics, completely expanded plastics particles are obtained which, because of the content of isobutylene polymer or copolymer, can be welded to one another even at a temperature below the crystallite melting point of the olefin polymer. The molecular weight of a suitable polyisobutylene may be from 10,000 to 200,000 (determined by the viscosity average) and that of a suitable isobutylene copolymer may be from 10,000 to 150,000 (determined by the viscosity average). The expanded plastics may be used for example for insulation and as inserts for packaging.

The mixture of olefin polymers and expanding agents may also contain other conventional additives such as fillers, dyes, pigments, flame retardants, antistatic agents, stabilizers, lubricants or plasticizers. The advantage of the process according to the invention lies in the fact that olefin polymers which have a very high molecular weight, for example of from 400,000 to 2,000,000, can be expanded using extruders. The invention is further illustrated by the following Examples. The parts given in the Examples are parts by weight.

EXAMPLE 1

25 kg. of a mixture of 100 parts of a polyethylene prepared by the low pressure polymerization method and having a density of 0.952 g./ccm., a mean molecular weight of 800,000 and an X-ray crystallinity at 25° C. of 75% by weight and 3 parts of talc is melted per hour in a twin-screw extruder (divided into five heatable zones) at a temperature of 180° C. The crystallite melting point of the polyethylene is 125° C. 5% by weight of xylene (based on the polyethylene) is metered at the said temperature under pressure into the fluxing zone of the extruder in which a shear rate of 150 seconds$^{-1}$ prevails. The mixture is then cooled to 150° C. and passes into a zone in which a shear rate of 1200 seconds$^{-1}$ prevails. Into this zone there is sprayed 15% by weight (based on the polyethylene used) of a hydrocarbon mixture consisting of 50 parts of n-heptane, 50 parts of n-pentane and 5 parts of polyisobutylene of a molecular weight of 50,000 by the viscosity average. A homogeneous gel forms in this zone. It is cooled in the next zone and expanded from a die having a 3 mm. circular orifice at a temperature of 115° C., which is 10° C. below the crystallite melting point of the olefin polymer. The extruded strand expands and has a diameter of 15 mm. Immediately after expansion the density of the expanded strand is 20 g./dm.$^3$. The strand is cut up into particles having a length equal to the diameter. About one hour after they have been prepared, the shrunken particles have a density of 80 g./dm.$^3$. These particles are kept for six hours at a pressure of 5 atmospheres and a temperature of 90° C. and then completely expanded particles are obtained which have assumed their original shape again.

These particles are superficially heated in a mold by means of hot air at 120° C. and then sintered together by compression to 50% of the original height of the layer. A foam article is obtained which is used for insulation purposes.

EXAMPLE 2

27 kg. of coarse-powdered polyethylene having a crystallinity degree of 90%, a crystallite melting point of 130° C., a density of 0.960 g./ccm. and a mean molecular weight of 1,200,000 is mixed dry with 0.8 kg. of talc and melted in a twin screw extruder. The temperature in the fluxing zone is 190° C. and the shear rate is 80 seconds$^{-1}$. 8% by weight of toluene (based on the polyethylene used) is metered into this zone at superatmospheric pressure. The melt containing toluene is cooled to a temperature of 155° C. and passed into a zone in which a shear rate of 1000 seconds$^{-1}$ prevails. 12% by weight (based on the polyethylene used) of an expanding agent mixture of 60 parts of n-heptane and 40 parts of n-pentane is also pumped at superatmospheric pressure into this zone. The expanding agent mixture contains 4% by weight of a copolymer of isobutylene and vinyl ether having a molecular weight of 30,000 and 6% by weight of a polyisobutylene having a molecular weight of 15,000 (the molecular weights are determined by the viscosity average). 5% by weight (based on the polyethylene used) of isobutene is also forced into this zone. The gel which is formed is cooled in the extruder to a temperature of 110° C. (this temperature being about 20° C. lower than the crystallite melting point of the olefin polymer) and expanded from a 2-mm. die to atmospheric pressure. The strand is cut into particles with a rotating blade. The bulk weight of the particles is 13 g./liter after having been kept as described in Example 1.

COMPARATIVE EXAMPLE

The procedure described in Example 2 is followed but in the absence of toluene. The hourly throughput has to be throttled down to 15 kg. if the maximum permissible torque is not to be exceeded. Only 8% by weight of the abovementioned expanding agent mixture can be incorporated homogeneously into the polyethylene. Expanded plastics particles are obtained which have a density of 350 g./liter.

EXAMPLE 3

25 kg. of a mixture of polypropylene (mean molecular weight about 450,000) having a crystalline fraction of 80%, 2.5% by weight of talc and 0.5% by weight of barium stearate to control the size of the cells is melted per hour in an extruder at a temperature of 185° C. The crystallite melting point of the polypropylene is 130° C.

4% by weight of benzene is metered into the fluxing zone at superatmospheric pressure. The shear rate in this zone is adjusted to about 100 seconds$^{-1}$. 18% by weight of an expanding agent consisting of 60 parts of n-butane and 40 parts of isobutane is metered into an adjacent zone which is kept at a temperature of 155° C. and in which a shear rate of 1200 seconds$^{-1}$ prevails. The gel of expanding agent and polymer which forms is cooled in the extruder to a temperature of 115° C. and expanded to atmospheric pressure through a multihole die. The issuing strand is cut up into particles of expanded plastics by a rotating blade. The particles which shrink immediately after their production are kept for two to ten hours (depending on the particle size) at a temperature of 90° C. and a pressure of 5 atmospheres. The bulk weight of the particles is 12 to 15 g./liter.

EXAMPLE 4

28 kg. of a mixture of polypropylene (mean molecular weight about 600,000) and 3% by weight of talc is treated analogously to Example 3 as regards temperature control and shear gradient. The crystallite melting point of the polypropylene is 130° C. 6% by weight of toluene, containing dissolved therein 20% by weight of polyisobutylene of a mean molecular weight of about 50,000 (determined by the viscosity average), is metered into the fluxing zone under pressure instead of benzene. A mixture consisting of 75 parts of butane and 25 parts of isopentane which is metered in a concentration of 20% by weight (based on the starting polymer) into the melt, also under pressure (40 atmospheres) serves as expanding agent.

The melt containing expanding agent is cooled to 115° C. and adiabatically expanded to atmospheric pressure in the extruder. The strand issuing from a circular die is granulated with a rotating blade. The bulk weight of the expanded particles after having been kept under pressure is 15 g./l. The particles are heated with hot air at 125° C. in a heating channel for five minutes. The particles which are slightly tacky are transferred to a press and compressed to 40% of the original height of the layer. After removal from the mold, a compact expanded plastic plate is obtained which is used as shock absorbing material in packaging or for insulation.

We claim:
1. A process for the production of expanded plastics from high molecular weight olefin polymers whose X-ray crystallinity at 25° C. is more than 50% by weight, wherein the olefin polymer is mixed at a temperature which is from 50° to 100° C. above the crystallite melting point of the olefin polymer and at a shear rate of from 20 to 200 seconds$^{-1}$ at superatmospheric pressure with an aromatic hydrocarbon having a boiling point not above 140° C., the amount of said aromatic hydrocarbon being from 0.5 to 10% by weight based on the weight of said olefin polymer, the mixture is introduced into a zone in which it is homogenized at a temperature of from the crystallite melting point of the polymer to a maximum of 50° C. above the same and at a shear rate of from 500 to 1500 seconds$^{-1}$ with from 5 to 40% by weight of a member selected from the group consisting of a hydrocarbon and a halohydrocarbon, said member having a boiling point of from 30° to 200° C. below the crystallite melting point of the olefin polymer, at a pressure which prevents expansion of the mixture, the gel formed is then cooled under superatmospheric pressure to a temperature which is from 10° to 60° C. below the crystallite melting point of the olefin polymer and it is then forced into a zone in which a pressure prevails which is lower than the vapor pressure of the expanding agent in the gel.

2. A process as claimed in claim 1 wherein the expanding agent contains from 5 to 30% by weight of polyisobutylene of a molecular weight of from 10,000 to 200,000 (determined by the viscosity average) or a copolymer of isobutylene of a molecular weight of from 10,000 to 150,000 (determined by the viscosity average).

3. A process as claimed in claim 1 wherein the gel is kept at a pressure of from 25 to 55 atmospheres.

4. A process as claimed in claim 1 wherein said olefin polymers have a molecular weight of from 400,000 to 2,000,000.

References Cited

UNITED STATES PATENTS 3,632,532  1/1972  Gaeth et al. ____ 260—2.5 HA
3,640,921  2/1972  Eberle et al. ____ 260—2.5 HA WILBERT J. BRIGGS, Sr., Primary Examiner U.S. Cl. X.R.

260—2.5 HA, 23 H, 33.6 PQ, 33.8 UA, 41 R, 94.9 GD, 897 A